United States Patent
Lee et al.

(10) Patent No.: US 7,448,054 B2
(45) Date of Patent: Nov. 4, 2008

(54) DISK CLAMPER WITH A CUSHION MEMBER

(75) Inventors: Cheng-Fu Lee, Taipei (TW); Ming-Hsing Lu, Taipei (TW); Chih-Hao Chen, Taipei (TW); Wu-Jen Lo, Taipei (TW)

(73) Assignee: Lite-On It Corporation, Taipei (TW)

( * ) Notice: Subject to any disclaimer, the term of this patent is extended or adjusted under 35 U.S.C. 154(b) by 397 days.

(21) Appl. No.: 11/046,870

(22) Filed: Feb. 1, 2005

(65) Prior Publication Data

US 2005/0188396 A1     Aug. 25, 2005

(30) Foreign Application Priority Data

Feb. 25, 2004    (TW) ............................. 93104847 A

(51) Int. Cl.
*G11B 17/03* (2006.01)
(52) U.S. Cl. ..................................... 720/706
(58) Field of Classification Search ................ 720/706, 720/712
See application file for complete search history.

(56) References Cited

U.S. PATENT DOCUMENTS

| 4,618,951 | A | * | 10/1986 | Okita et al. | .................. 720/707 |
| 4,649,445 | A | * | 3/1987  | Sheriff      | ..................... 360/99.04 |
| 4,736,358 | A | * | 4/1988  | Hoshi et al. | .................. 720/713 |
| 4,737,948 | A | * | 4/1988  | Okita        | .......................... 720/712 |
| 6,799,324 | B1 | * | 9/2004 | Takagi et al.| ................. 720/712 |

FOREIGN PATENT DOCUMENTS

| CN | 1447334 A | 10/2003 |
| CN | 2596499 Y | 12/2003 |

* cited by examiner

*Primary Examiner*—David D Davis
(74) *Attorney, Agent, or Firm*—Bacon & Thomas, PLLC

(57) ABSTRACT

An apparatus for clamping a disk comprises a clamper and a turntable. The clamper having a first cushion member is disposed on a bottom side of the clamper. The turntable is movably disposed relative to the clamper thereby clamping the disk between the turntable and the clamper. When the turntable is moved toward the bottom side of the clamper, one of the turntable and the disk touches the first cushion member first and then the clamper attaches to the turntable tightly for clamping the disk between the clamper and the turntable, therefore a striking force generated from the impact of one of the turntable and the disk on the clamper is reduced by the first cushion member.

12 Claims, 3 Drawing Sheets

DISK CLAMPER WITH A CUSHION MEMBER

This application claims the benefit of Taiwan application Serial No. 093104847, filed Feb. 25, 2004, the subject matter of which is incorporated herein by reference.

BACKGROUND OF THE INVENTION

1. Field of the Invention

The invention relates in general to a disk clamping apparatus of the optical disk device, and more particularly to a disk clamping apparatus with cushioning function.

2. Description of the Related Art

In recent years, due to the popularity of digital multimedia disk, the optical disk device has become an indispensable part in a modern life. Traditionally, the optical disk device at least includes an optical module, a turntable, and a clamper. The disk is clamped between the clamper and the turntable tightly. When the disk is rotating at a high speed on the turntable, the turntable and the clamper keep it stable from wobbling, which help the optical module read the data on the disk effectively.

Furthermore, an inbuilt force is designed in order to make the turntable and the clamper attached tightly. The force must be strong enough so as to stabilize a disk on the turntable while rotating at a high speed. However, under the condition of inbuilt force, noise occurs when the turntable hit the clamper. It is one of the goals the manufacturers devote themselves to achieve to reduce the noise and improve the quality of optical disk device at the same time.

SUMMARY OF THE INVENTION

It is therefore an object of the invention to provide an optical disk device with cushioning function, which reduces the striking force while the disk is clamping between the clamper and the turntable in order to lower the noise.

The invention achieves the above-identified object by providing an apparatus for clamping a disk comprising a clamper and a turntable. The clamper having a first cushion member is disposed on a bottom side of the clamper. The turntable is movably disposed relative to the clamper thereby clamping the disk between the turntable and the clamper. When the turntable is moved toward the bottom side of the clamper, one of the turntable and the disk touches the first cushion member first and then the clamper attaches to the turntable tightly for clamping the disk between the clamper and the turntable, therefore a striking force generated from the impact of one of the turntable and the disk on the clamper is reduced by the first cushion member.

The invention achieves the above-identified object by providing an optical disk device comprising a housing, an optical module, and a disk clamping apparatus. The optical module is disposed in the housing and located at a side of a disk for reading the information of the disk. The disk clamping apparatus is disposed in the housing and steadily holding the disk while the turntable rotating the disk at a high speed. The disk clamping apparatus comprises a clamper and a turntable. The clamper having a first cushion member is disposed on a bottom side of the clamper. The turntable is movably disposed relative to the clamper, thereby clamping the disk between the turntable and the clamper. When the turntable is moved towards the bottom side of the clamper, one of the turntable and the disk touches the first buffer member first and then the clamper attaches to the turntable tightly for clamping the disk between the clamper and the turntable, and therefore a striking force generated from the impact of one of the turntable and the disk on the clamper is reduced by the first cushion member.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
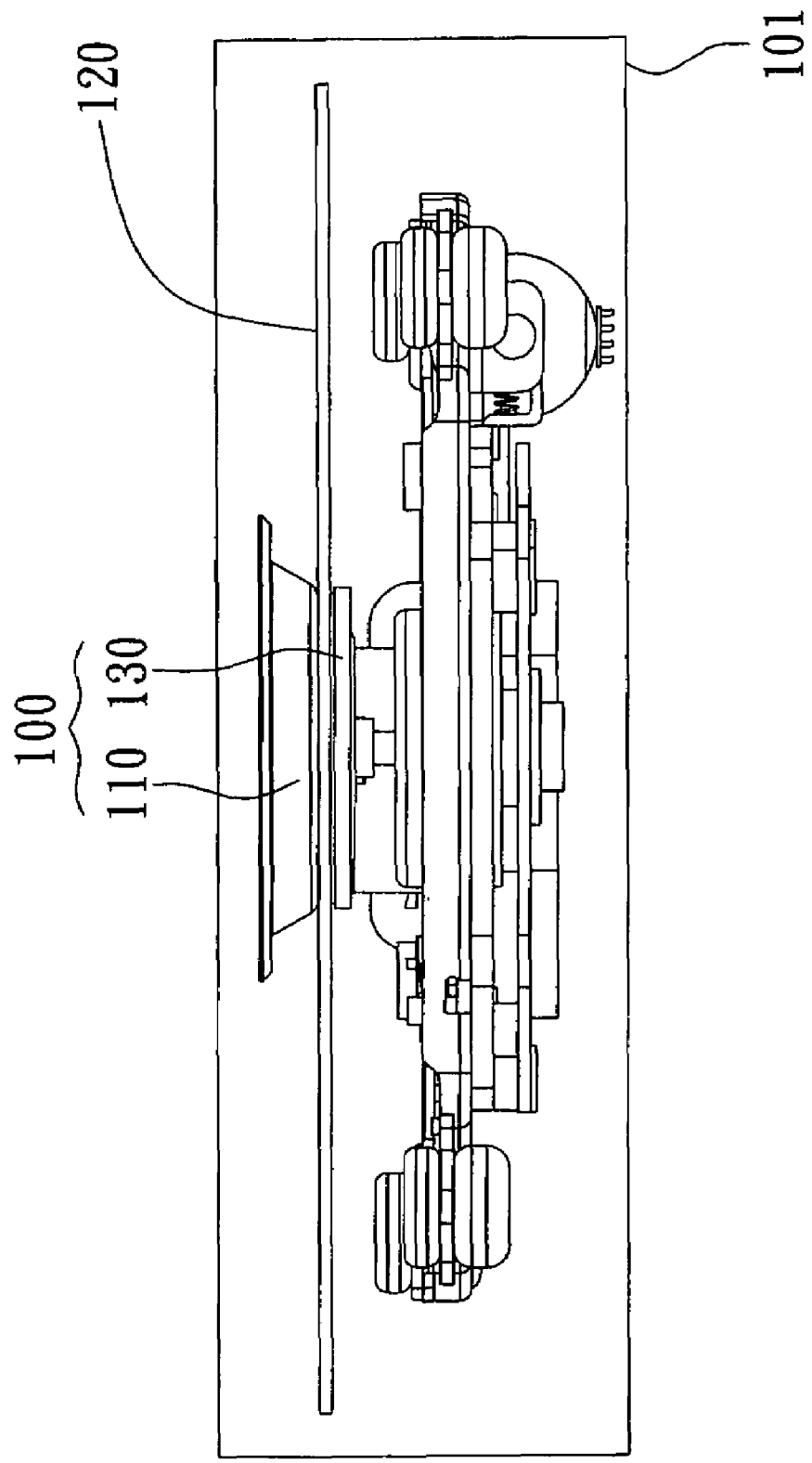
FIG. 1 is a lateral view illustrating an optical disk device in accordance with the preferred embodiment of the invention.

Referring to FIG. 1, a lateral view illustrates an optical disk device in accordance with the preferred embodiment of the invention. The optical disk device 200 includes a housing 101, an optical module (not shown) and a disk clamping apparatus 100. The disk clamping apparatus 100 includes a clamper 110 and a turntable 130. The optical module is disposed in the housing 101 and located at a side of a disk 120 for reading the information of the disk 120. The disk clamping apparatus 100 is disposed in the housing 101 and is used for steadily holding the disk 120 while the disk 120 is rotated at a high speed by the turntable 130. The turntable 130 is movably disposed relative to the clamper 110; for example, the turntable 130 is disposed right beneath the clamper 110. By operating with gears, the turntable 130 is lifted up and down, which allows the turntable 130 to move towards and away from the clamper 110. When the turntable 130 is located in the lowest position, a gap exists between the turntable 130 and the clamper 110. After the disk 120 is loaded in the optical disk device 100 and located between the damper 110 and the turntable 130, the turntable 130 is lifted up to the highest position for tightly holding the disk 120 with the clamper 110 as shown in FIG. 1.

Figure 2A:
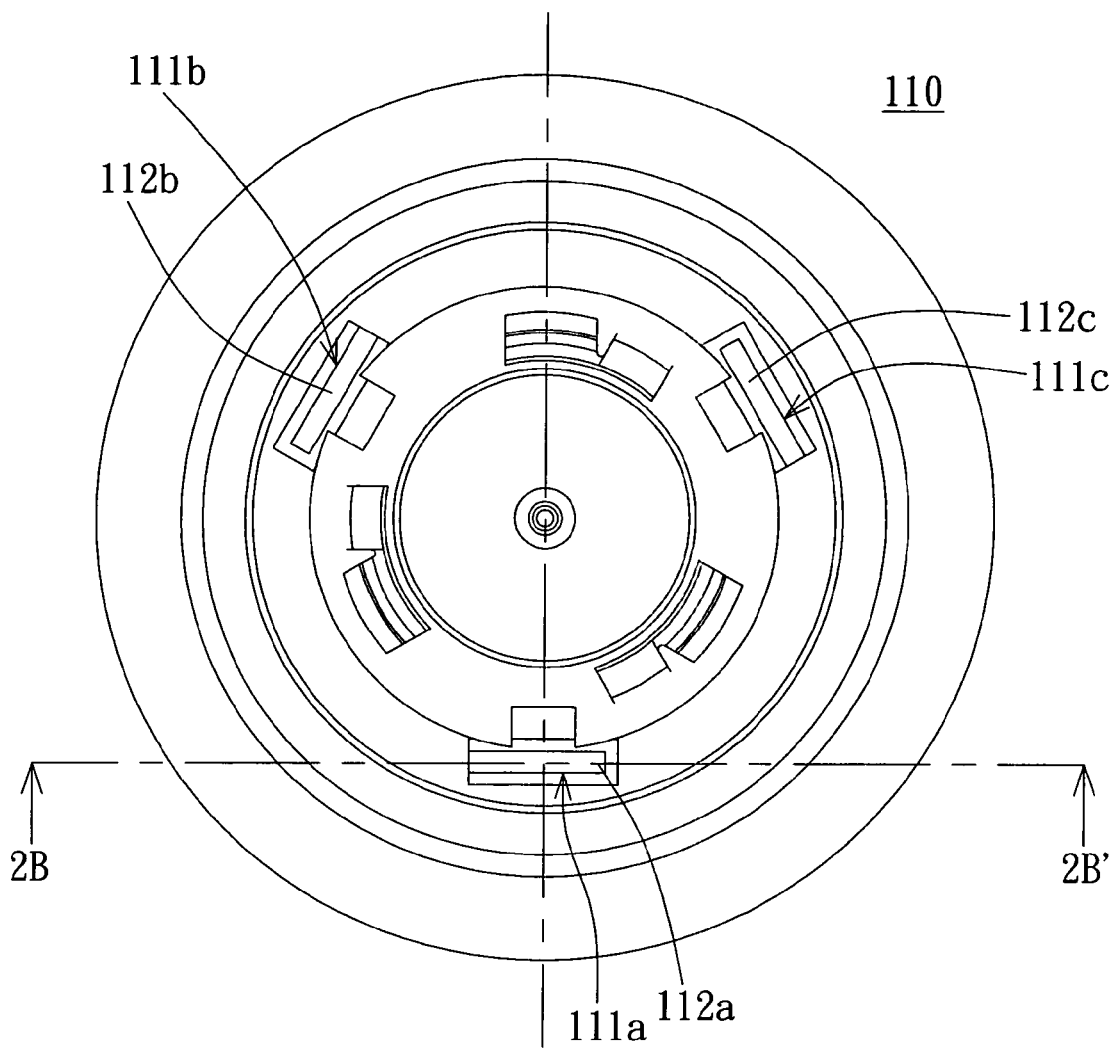
FIG. 2A schematically illustrates a bottom view of the clamper shown in FIG. 1.
Figure 2B:
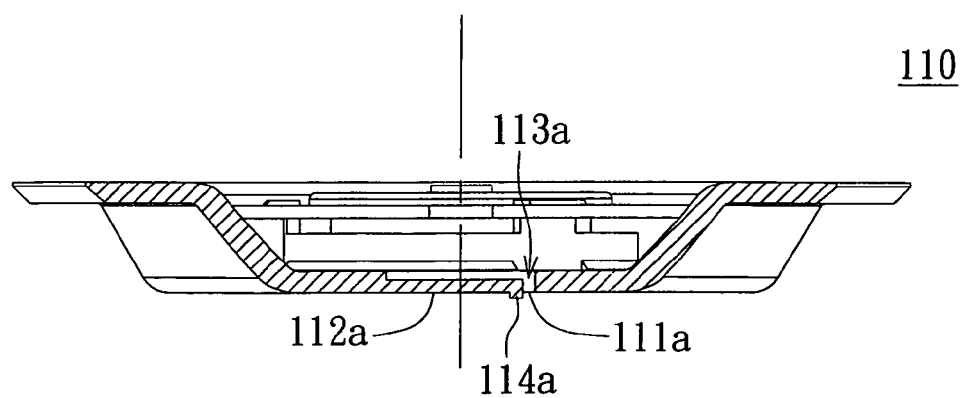
FIG. 2B schematically illustrates a cross-sectional view of the clamper take along a sectional line of 2B-2B' shown in FIG. 2A.

FIG. 2A schematically illustrates a bottom view of the clamper shown in FIG. 1. The clamper 110 includes a first cushion member 112a disposed on the bottom side of the clamper 110. FIG. 2B schematically illustrates a cross-sectional view of the clamper take along a sectional line of 2B-2B' shown in FIG. 2A. The clamper 110 further has an opening 111a disposed on the bottom side of the clamper 110 and positioned relative to the first cushion member 112a. One end of the first cushion member 112a is a fixed end that is connected to the inner wall of the opening 111a, and the other end of the first cushion member 112a is a free end that projects from the opening and is swayably moved around the opening 111a; for example, the free end of the first cushion member 112a can move inside and outside of the opening 111a. Besides, the clamper 110 has a space 113a, and the first cushion member 112a further includes a protruding portion 114a. The protruding portion 114a is disposed at the cushion end of the first cushion member 112a and protrudes from the opening 111a.

Figure 3A:
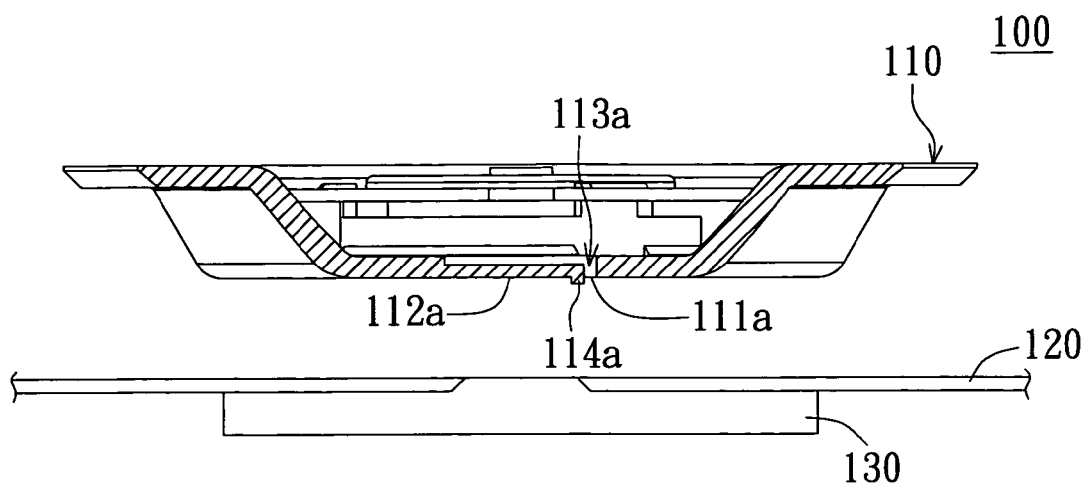
FIG. 3A is a lateral view of the disk clamping apparatus shown in FIG. 1 when the clamper is separated from the turntable.
Figure 3B:
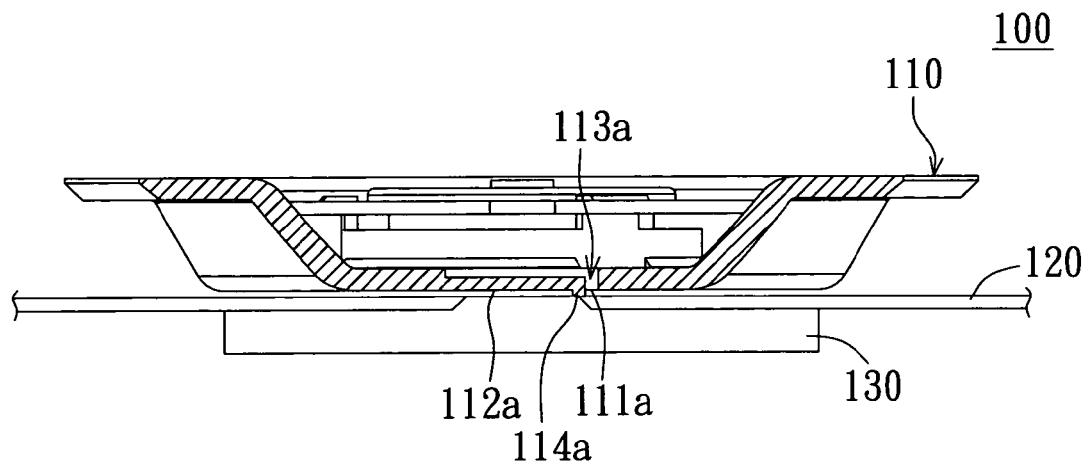
FIG. 3B is a lateral view of the disk clamping apparatus shown in FIG. 1 when the clamper just touches the turntable.
Figure 3C:
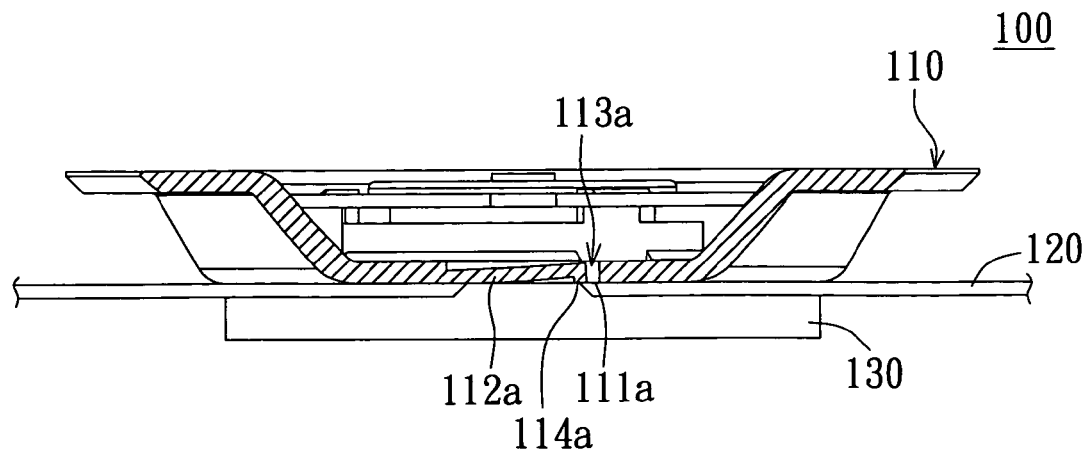
FIG. 3C is a lateral view of the disk clamping apparatus shown in FIG. 1 when the clamper is attached to the turntable tightly.

Referring to the FIG. 3A~3C, continuous diagrams showing the process of clamping the disk. FIG. 3A is a lateral view of the disk clamping apparatus shown in FIG. 1 when the clamper is separated from the turntable, FIG. 3B is a lateral view of the disk clamping apparatus shown in FIG. 1 when the clamper just touches the turntable, and FIG. 3C is a lateral view of the disk clamping apparatus shown in FIG. 1 when the clamper is attached to the turntable. In the process of clamping a disk, the disk 120 is first carried by the turntable 130 separated from the clamper as shown in FIG. 3A. When the disk 120 and the turntable 130 is lifted up and moved towards the clamper 110, one of the turntable 130 and the disk 120 first touches the protruding portion 114a of the first cushion member 112a projected from the opening 111a as shown in FIG. 3B. After the disk 120 and the turntable 130 further move towards the clamper 110, the whole first cushion member 112a is then pressed into the space 113a as shown in FIG. 3C. Finally, the disk 120 could be tightly clamped between the clamper 110 and the turntable 130, and then the disk 120 could be stably rotated at a high speed. By elongating the bumping process of the turntable 130 and the clamper 110 with the first cushion member 112a, an averaged striking force per second is reduced and then the noise generated during bumping process is lowered.

Additionally, several cushion members could be applied in the disk clamping apparatus for preferably providing a cushioning mechanism. For example, the disk clamping apparatus 100 further comprises a second cushion member 112b and a third cushion member 112c, which are preferably disposed on the bottom side of the clamper 110 with the first cushion member 112a in an even arrangement as shown in FIG. 2A. Accordingly, three openings 111a, 111b and 111c are disposed on the bottom side of the clamper 110 and located relative to the first cushion member 112a, the second cushion member 112b, and the third cushion member 112c; for example, the second cushion member 112b and the third cushion member 112c are respectively disposed in the opening 111b and 111c. The cushion member is preferably an elastic object, such as a leaf spring, a spring, and an elastic cantilever.

Moreover, the first cushion member 112a and the clamper 110 are preferably integrated as a whole as shown in FIG. 2B. For example, the clamper 110 has a plastic housing, and the first cushion member 112a is made of the same plastic material extending from the plastic housing.

In the optical disk device according to the preferred embodiment of the invention, the cushion member can not only stabilize the disk turning at a high speed but also reduce the noise during disk clamping, both of which improve the quality of the optical disk device. Besides, the manufacturing cost can be further decreased due to the integration of the cushion member and the clamper.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for clamping a disk, comprising:
   a clamper, having a first cushion member disposed on a bottom side of the clamper, and an opening disposed on the bottom side of the clamper, wherein a fixed end of the first cushion member is connected to an inner wall of the opening, and a free end of the first cushion member projects from the opening and is swayably movable around the opening; and
   a turntable, movably disposed relative to the clamper thereby clamping the disk between the turntable and the clamper;
   wherein when the turntable is moved toward the bottom side of the clamper, one of the turntable and the disk touches the first cushion member first and then the clamper attaches to the turntable tightly for clamping the disk between the clamper and the turntable;
   wherein the first cushion member is moved vertically when one of the turntable and the disk touches the first cushion member.

2. The apparatus according to claim 1, wherein the clamper has a space within an opening, and the first cushion member further has a protruding portion disposed on the free end of the first cushion member and protruded from the opening for touching one of the turntable and the disk first when the turntable is moved towards the bottom side of the clamper.

3. The apparatus according to claim 1, wherein the first cushion member and the clamper are integrated as a whole.

4. The apparatus according to claim 1, wherein the first cushion member is an elastic object.

5. The apparatus according to claim 4, wherein the elastic object is a leaf spring, a spring, or an elastic cantilever.

6. The apparatus according to claim 1 further comprises a second cushion member and a third cushion member, disposed on the bottom side of the clamper with the first cushion member in an even arrangement.

7. An optical disk device, comprising
   a housing;
   an optical module, disposed in the housing and located at a side of a disk for reading the information of the disk; and
   a disk clamping apparatus, disposed in the housing and steadily holding the disk while the turntable rotating the disk at a high speed, the disk clamping apparatus comprising: a clamper, having a first cushion member disposed on a bottom side of the clamper, and an opening disposed on the bottom side of the clamper, wherein a fixed end of the first cushion member is connected to the inner wall of the opening, and a free end of the first cushion member projects from the opening and is swayably movable around the opening; and a turntable, movably disposed relative to the clamper thereby clamping the disk between the turntable and the clamper;
   wherein when the turntable is moved towards the bottom side of the clamper, one of the turntable and the disk touches the first cushion member first and then the clamper attaches to the turntable tightly for clamping the disk between the clamper and the turntable;
   wherein the first cushion member is moved vertically when one of the turntable and the disk touches the first cushion member.

8. The optical disk device according to claim 7, wherein the clamper has a space within the opening, and the first cushion member further has a protruding portion disposed on the free end of the first cushion member and protruded from the opening for touching one of the turntable and the disk first when the turntable is moved towards the bottom sided of the clamper.

9. The optical disk device according to claim 7, wherein the first cushion member and the clamper are integrated as a whole.

10. The optical disk device according to claim 7, wherein the first cushion member is an elastic object.

11. The optical disk device according to claim 10, wherein the elastic object is a leaf spring, a spring, or an elastic cantilever.

12. The optical disk device according to claim 7 further comprises a second cushion member and a third cushion member, disposed on the bottom side of the clamper with the first cushion member in an even arrangement.

* * * * *